Figure 1:
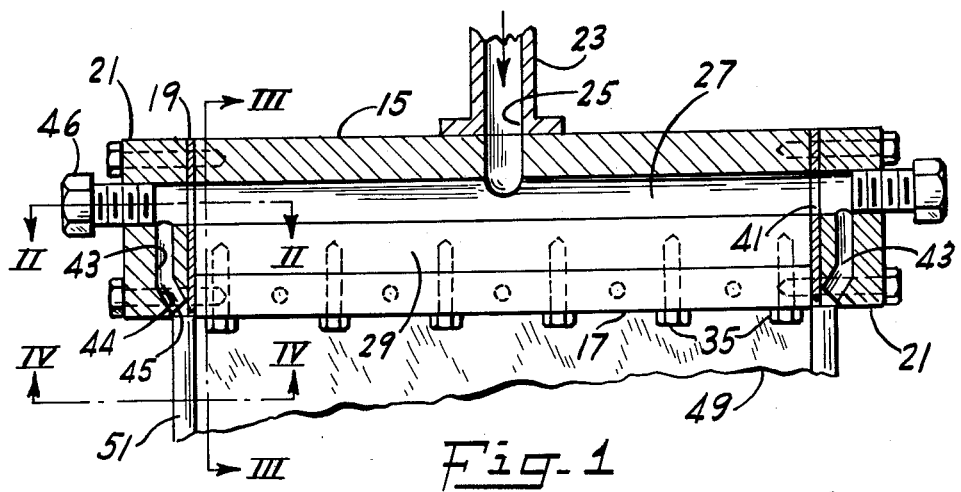

Jan. 15, 1963   H. J. McDERMOTT ETAL   3,072,962
FILM EXTRUSION NOZZLE
Filed June 20, 1960

United States Patent Office 3,072,962
Patented Jan. 15, 1963

3,072,962
FILM EXTRUSION NOZZLE
Henry J. McDermott, Collingdale, and Hugo Paul Koppehele, Glen Riddle, Pa., assignors to American Viscose Corporation, Philadelphia, Pa., a corporation of Delaware
Filed June 20, 1960, Ser. No. 37,463
19 Claims. (Cl. 18—12)

The invention relates to the production of films or sheets and more particularly to an improved procedure and shaping die or nozzle for forming films having thickened or beaded portions along opposite edges thereof.

To better adapt films for various manipulative operations, it is customary to initially shape the same with thickened or beaded longitudinal edges. Aside from imparting increased strength to the film, the beaded edges often serve as a means by which the film may be engaged and passed through subsequent treatments in a continuous manner. In the manufacture of films formed of polymeric materials, for example, beads formed along opposite longitudinal edges of the film permit the film to be retained and continuously advanced along diverging guide members to thereby laterally or biaxially stretch the film and orient the molecules thereof.

While it is generally recognized that films having thickened edges or beads may facilitate the use of improved and simplified procedures during subsequent film stretching or other treatment, complete success with such procedures has as yet not been achieved. One of the most serious problems encountered is that of initially forming the beaded edge film or at least that portion of the film extending between the longitudinal beads, with a substantially uniform cross section so as to insure that all parts of the film are uniformly treated during subsequent operations. with the conventional procedure of extruding a film-forming material through a die opening having substantially parallel walls and enlarged end sections, the web of the resulting film includes sections of reduced thickness directly adjacent to the beads themselves thus providing weakened areas along the entire film length. Steps taken to reduce or minimize the tendency for the film web to neck adjacent to the film beads have been numerous and varied but have failed to provide a satisfactory solution to the problem.

In situations wherein the beaded edges of the film are ultimately trimmed from the web as waste it is, of course, highly desirable to minimize the size of the beaded edges. Along these lines, recent advances in the art of film stretching now make it possible to satisfactorily stretch films which are of increased web thickness yet require no corresponding increase in the size of the film beaded edges. Thus, these improved stretching procedures facilitate a substantial reduction in the percentage of waste, especially as films of increased web thickness are being processed. It has been found, however, that with conventional extrusion nozzles variation in the thickness of the film web while maintaining the beaded edges thereof of constant size requires numerous tedious adjustments and/or substitution of nozzle parts, and often necessitates that extrusion operations be stopped completely. Accordingly, a primary object of the invention is to provide a new or improved and more satisfactory method and apparatus for making films having thickened or beaded edges.

Another object is to provide a method and apparatus for forming beaded edge film in which the film web is of substantially uniform cross section along its entire width.

Still another object is to provide a method for making beaded edge film wherein the film beads and web are independently shaped and then united into an integral structure.

A further object of the invention is to provide an apparatus wherein independent streams of film-forming material are shaped into desired cross sections and then directed toward and united with the longitudinal edges of a film web concomitantly with the extrusion of the same.

Figure 2:
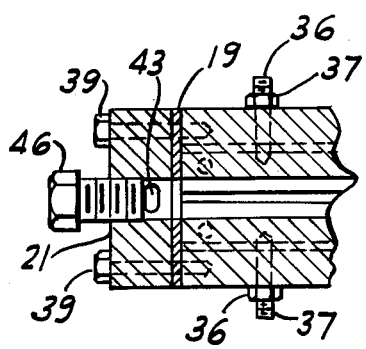
Figure 3:
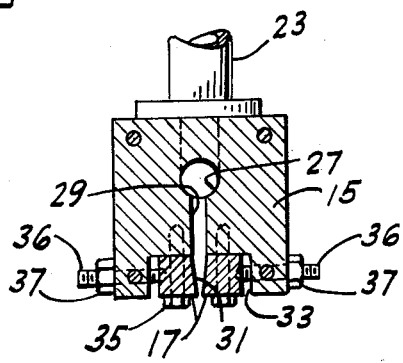
Figure 4:
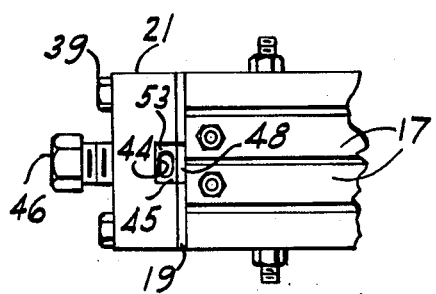
Figure 5:
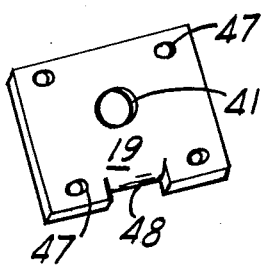
Figure 6:
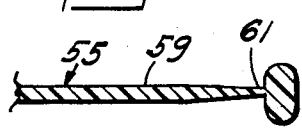
Figure 7:
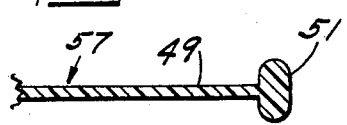

A still further object is to provide a method and apparatus for making beaded-edge films of various web thicknesses while maintaining the beaded edges thereof of substantially constant size. These and other objects and advantages of the invention will be apparent from the following description and accompanying drawing in which:

FIGURE 1 is a vertical section taken longitudinally of the nozzle of the present invention;
FIGURE 2 is a section of a portion of the nozzle taken along the line II—II of FIGURE 1;
FIGURE 3 is a vertical section of the nozzle taken along the line III—III of FIGURE 1;
FIGURE 4 is a view of one end of the nozzle as seen along the line IV—IV of FIGURE 1;
FIGURE 5 is a perspective view of one element of the nozzle shown in FIGURE 1;
FIGURE 6 is a vertical section taken through a portion of a beaded edge film formed in a conventional manner; and
FIGURE 7 is a view similar to FIGURE 6 illustrating a portion of a film formed in accordance with the present invention.

In general, the present invention is directed to a method and apparatus for making a film or sheet having thickened or beaded longitudinal edges by shaping a plastic or flowable film-forming material into two independent streams of desired cross section and then uniting the same with the longitudinal edges of a web of film-forming material concommitantly with the shaping of the web itself. The die or nozzle of the present invention, in some respects, resembles a nozzle of conventional construction and includes a housing having a feed chamber which opens into a space formed by a pair of cooperating blades fixed to the housing, a block secured to each end of the housing, and a spacer or divider plate interposed between each end block and the housing.

As film-forming material is delivered into the housing feed chamber, a portion thereof passes between the blades where it is shaped into a web having a desired thickness, while other portions are directed into channels formed in the end blocks. The end block channels are each provided with means for regulating the flow of film-forming material therethrough and cooperate with an adjacent spacer or divider plate in shaping film-forming material into an independent stream of desired cross section. The exit portions of the end block channels may be angled or inclined, especially for high speed extrusion operations, so as to direct the streams of film-forming material issuing therefrom into engagement with the longitudinal edges of a web of film-forming material either prior to, during or immediately after the web passes between the extrusion blades. Once these independently shaped portions are combined, they are set to provide a unitary structure.

The method and apparatus of the present invention are hereafter described as employed in the manufacture of beaded-edge film formed of plastic or fusible film-forming materials, and more specifically beaded-edge films formed of polymeric materials, such as ethylene or propylene. The teachings of the present invention are, of course, applicable to the forming of beaded-edge films from a variety of different materials which are capable of being rendered plastic or molten for extrusion. As heretofore mentioned, and more fully described hereafter, the film produced by the method and apparatus of the present invention consists of a web of substantially uniform thickness across its entire width having thickened or beaded opposite longitudinal edges. It will be understood that the size and shape of the film web and beads may be varied from that illustrated without departing from the spirit and scope of the invention.

Referring now to the drawing, the nozzle of the present invention includes an elongated main body or housing 15, spaced lip members or extrusion blades 17, spacer or divider plates 19 and end blocks 21. The housing 15 is connected to a supply conduit 23 and is provided with an inlet opening 25 through which the molten polymer, such as polypropylene, is delivered into a feed chamber 27 extending along the entire housing length. A slot or restricted passage 29 opens into the feed chamber 27 for directing the molten polymer into an extrusion orifice 31 formed by the blades 17. A recess 33 is formed in the forward wall of the housing 15 for receiving the blades 17 which are held in place by bolts 35 which extend through enlarged or elongated openings in the blades themselves so as to permit the same to be selectively adjusted toward and away from each other. Adjustment of the blades 17 is effected by tension screws 36 which pass through portions of the housing 15 and are threaded into the blades themselves, with tension being applied to the screws 36 by nuts 37 which bear up against adjacent housing walls.

The divider plates 19 and end blocks 21 are secured to the ends of the housing 15 by bolts 39. Each of the plates 19 is provided with an opening 41 which registers with and connects the housing feed chamber 27 with a channel or slot 43 formed within and extending through an adjacent end block 21. The channels are of a configuration which generally conforms to the desired shape of the beads in the finished film and, as best seen in FIGURES 2 and 4, are longitudinally aligned with the ends of the feed chamber 27 and the extrusion orifice 31. While end blocks having substantially straight channels positioned directly adjacent to the respective divider plates 19 have been found to operate satisfactorily, to adapt the apparatus for a variety of operating conditions it is preferred to have the exit portions of the end block channels 43 angled or inclined toward the extrusion orifice 31 as shown at 44. The end block channel portions 44 each open into a recess 45 formed across one corner of the end block and substantially in alignment with extrusion orifice 31. A screw 46 extends through each of the end blocks 21 for regulating the flow of molten polymer into the end block channels 43, as more fully described hereafter.

For the sake of simplicity in the manufacture and assembly of the parts, the divider plates 19 are of a construction as shown in FIGURE 5, each having openings 47 for the reception of bolts 39 and a notch 48 in one edge corresponding to the width of the end block recess 45. Preferably, the notched edge of the divider plates 19 are tapered or feathered to facilitate a streamlined flow of the molten polymer relative thereto.

In using the apparatus of the invention, the blades 17 are initially adjusted by the tension screws 36 and nuts 37 to provide an extrusion orifice 31 of desired size, after which the bolts 35 are tightened to fix the blades 17 in place. The molten polymer is then delivered through the conduit 23 and into the nozzle housing 15 where it initially fills the feed chamber 27 and the restricted passage 29. As the molten polymer is continuously delivered through the conduit 23, the polymer within the restricted passage 29 is urged into and through the extrusion orifice 31 to form a shaped web of polymeric material, as shown at 49. Concomitantly, a portion of the molten polymer within the feed chamber 27 is gradually forced through the divider plate openings 41 and into the channels 43 in the nozzle end blocks 21, with the amount of flow into the channels 43 being regulated by the adjustment of the screws 36.

From the description of the method given thus far, it will be noted that the single stream or mass of molten polymer delivered into the nozzle housing is separated into three independent streams which move, respectively, into the extrusion orifice 31 and the end block channels 43. In passing through the extrusion orifice 31, the molten polymer is shaped by the cooperating blades 17 into a web 49 which is of substantially uniform thickness along its entire width. The streams of molten polymer forced outwardly of the ends of the feed chamber 27, however, are shaped by the walls of the end block channels 43 into continuous beads 51, each having a thickness greater than that of the film web 49. As heretofore described and shown in FIGURE 2, the end block channels 43, and particularly the exit portions 44 thereof, are aligned longitudinally with the extrusion orifice 31 so that the beads 51 engage with the adjacent edges of web 49 immediately as they move beyond the feathered edges 48 of the plates 19. Setting of the film beads and web into an integral structure as shown at 53 is effected by cooling the same, as by the ambient atmosphere or streams of cold air or within a tank of cold water, outwardly of the nozzle itself.

As shown in FIGURE 1, the divider plates 19 each cover at least a portion of the recess 45 in the adjacent end block 21 to maintain a separate flow of molten polymer through the extrusion orifice 31 and the end block recesses 45 during at least initial shaping thereof. In addition, the divider plates 19 also exercise control over the direction of flow of the molten polymer as it issues from the end block recess 45 as shaped streams 51. More specifically, as the molten polymer leaves the inclined portions 44 of the end block channels 43, it engages with the adjacent divider plates 19 and is diverted outwardly of the end block recesses 45 as shaped streams or beaded portions 51. In view of the direction of flow of the polymer as it enters the recesses 45 and the deflecting function performed by the divider plates 19, it will be apparent that the polymer streams issue from the end block recesses 45 along converging paths which intersect with the edges of the shaped web 49 of molten polymer extruded through the orifice 31. As a result, contact between the edges of web 49 and shaped streams 51 is achieved as or immediately after these shaped portions leave the extrusion nozzle, notwithstanding the presence of necking or transverse contraction of the web 49. It will be noted that the gradual merging of the shaped streams of molten polymer 51 with the adjacent edges of the shaped web 49 provides for a close or snug contact between these independently shaped portions before any substantial cooling of the same is effected and without disturbing their configuration or flow characteristics.

The angle at which the shaped polymer streams 51 engage with the adjacent edges of the shaped web 49, or more accurately, the resultant velocity of each of the polymer streams as they issue from the end block recesses 45 is dependent on such consideration as the area of the respective divider plates 19 which is effective in deflecting the polymer as it is delivered into the end block recesses 45 and the inclination of the exit portions 44 of the end block channels 43. To achieve the formation of a beaded-edge film in which the web is of uniform thickness along its entire width and to facilitate engagement between the shaped web 49 and streams 51 during or immediately after their passage from the nozzle, it is essential that the divider plates 19 extend over at least a portion of the adjacent end block recesses 45, and preferably terminate at or inwardly of the exposed edges of the blades 17.

The inclination of the exit portions 44 of the end block channels 43 should be such that the extruded streams of molten polymer 51 travel angularly toward the edges of the shaped polymer web 49 so as to provide snug contact between these extruded portions before they undergo substantial cooling and without disturbing either their configuration or flow characteristics. This objective is achieved by disposing the exit portion 44 of the respective end block channels 43 at substantially right angles to the inclined wall 53 of the end block recesses 45 and at an angle to a plane extending perpendicular to the axis of extrusion orifice 31. This last-mentioned angle is desirably within the range of 30° to 80° to satisfy a variety of operating conditions, and preferably from 55° to 65° for optimum results.

To better appreciate advances resulting from the present invention, reference is made to FIGURES 6 and 7 of the drawing which illustrate fragmentary cross sections of beaded edge polypropylene films 55 and 57 formed by a conventional procedure and by the method described above, respectively. In comparing these figures, it will be noted that the web 59 of the conventional beaded edge film 55 has pronounced necked or drawn portions 61 directly adjacent to the film beads, while the web 49 of the film 57 is of substantially uniform cross section along its entire width. The necked portions 61 of course constitute weakened sections in the finished film and, in effect, limit the loads which can be applied thereto. In stretching the polypropylene film 55 in a transverse direction, it has been found that the loads necessary for achieving a desired orientation of the polymer molecules often approach or exceed the strength of the film necked portions 61, thus causing the film to tear along these areas.

The occurrence of the neck portions 61 in conventional polypropylene films, such as shown at 55, is believed to be due to the surface tension forces which act upon the molten polymer of the beads themselves. These surface tension forces act uniformly along the entire circumference of the film beads and naturally tend to minimize the bead surface area. When extruding the film web and beads together as an integral unit, the effect of the surface tension forces acting upon the molten polymer of the film beads is exerted also onto that portion of the molten polymer comprising the film web to which the beads are connected. As a result, the molten polymer of that portion of the web directly adjacent to the film beads is drawn into a mass of polymer comprising the beads themselves, thus providing the finished film with necked or drawn portions 61. To better illustrate the magnitude and effect of these surface tension forces, beaded edge polypropylene films have been formed by conventional procedures wherein the film webs, as extruded, were intentionally thickened in the area directly adjacent to the film beads. As these films were extruded and cooled, the film beads appeared to grow in size as a result of some of the molten polymer being drawn from the adjacent areas of the film web, with the resulting film having the usual necked portions, such as shown at 61 in FIGURE 6, and greatly enlarged beads.

While the present invention has not eliminated the surface tension force acting upon the film beads, it appears that the initial shaping of the film beads independently of the film web confines the effects of these surface tension forces to the molten polymer forming the film beads themselves and thus assists in the shaping of the same. As the film beads are combined with the independently formed web, the molten polymer constituting these parts is apparently in an equilibrium condition and thus retains the shape which has been imparted thereto by respective shaping members.

The film beads and web need be separated by the divider plates 19 for only a relatively short period, depending upon such factors as the size of the film beads, the rate of extrusion, the temperature of the molten polymer, etc. It is preferred that the divider plates be as thin as possible, on the order of 0.010 to 0.015 inch, to insure that the film web and beads are properly united; that is, while still in a highly desired plastic condition when combined. A preferred procedure, however, is to use divider plates which are thin cross section, as noted above, but which are of different lengths to maintain the film beads separated from the web for a desired period of time. Under certain conditions the plates 19 may be of such length that their free edges 48 are located within the nozzle itself while under other conditions the plates 19 may project beyond the outer surfaces of the blades 17. The degree to which the plates 19 project from the nozzle should, of course, be minimized to insure that the film beads and web are still in a plastic or tacky condition and are properly aligned when they are engaged with each other.

It will of course be apparent that the divider plates 19 may be formed integrally with either the nozzle housing 15 or end blocks 21 but are preferably of the construction as described for ease of replacement and nozzle manufacture and cleaning. Similarly, in lieu of merely inclining the exit portions of the end block channels 43, the entire channels may be inclined without detracting from the advantages described.

A further advantage of the nozzle described is the ability to accurately control the size of the beaded edges of the film as film web thickness or gage is varied. As heretofore mentioned, the shaped molten polymer is quenched as it issues from the nozzle, preferably by a water bath located at a predetermined distance from the nozzle itself. Generally, the quenched film is engaged by a pair of nip rolls which serve to draw the molten polymer as it is extruded from the nozzle to thereby longitudinally orient the polymer molecules to at least a small degree so as to render the film more suitable for biaxial stretching. The degree of drawing of the extruded molten polymer is usually expressed as the "draw-down ratio" and is given separately for the film beads and webs, as follows:

$$WDR = \frac{V_1}{V_2} \text{ and } BDR = \frac{V_1}{V_3}$$

where:

WDR is the film web draw-down ratio;
BDR is the film bead draw-down ratio;
$V_1$ is the velocity of the quenched films after being drawn;
$V_2$ is the velocity of the molten polymer forming the film web as it issues from between the nozzle blades; and
$V_3$ is the velocity of the molten polymer forming the film beads as it issues from the nozzle end block.

The effect which this drawing of the extruded molten polymer has on the size of the resulting film is to a large degree determined by the rate at which the film is quenched. When the freshly extruded film of molten polymer is quenched rapidly, little opportunity exists for the film to neck or narrow in a transverse direction so that the applied longitudinal or drawing tensions induce a reduction in the thickness of the extruded film. Alternatively, a delayed quenching of the freshly extruded film of molten polymer is reflected almost entirely as a decrease in width of the web.

With regard to the molten polymer forming the beaded edges of the film, the area-to-mass ratio of this portion of the film is much lower than that of the film web so that the rate of quenching plays a less critical role. In this case the bead draw-down ratio (BDR) is of paramount importance in determining the size of the beaded edges of the quenched film as illustrated by the formula $$A_2 = \frac{A_1}{BDR}$$

where:

$A_1$ is the cross-sectional area of one stream of molten polymer as it issues from an end block recess; and
$A_2$ is the cross-sectional area of one beaded edge in the film after being quenched.

It will be apparent from the above description that by changing the rate of quenching and/or the web draw-down ratio (WDR), variations in the thickness of the film may be achieved, while changing the bead draw-down ratio (BDR) facilitates film beaded edges of different cross-sectional sizes. For example, under operating conditions at which the molten polymeric material is flowing from the extrusion orifice 31 and end block recesses 45 at substantially the same velocity, at any given surface velocity of the nip roll assembly the web draw-down ratio (WDR) will be equal to the bead draw-down ratio (BDR). As heretofore explained, the rate of quenching or the distance travelled by the freshly extruded film before being quenched would provide a film web and bead edges of a certain specific size under these operating conditions. If it is now desired to provide a film with beaded edges of smaller size, the screws 46 would be adjusted to reduce the flow of the molten polymer into the end block channels 43. By means of this adjustment, it will be apparent that the streams of molten polymer issuing from the nozzle end blocks are of the same cross section as heretofore provided but that such streams are moving at a reduced velocity. With the surface speed of the nip roll assembly kept at a constant speed, the bead draw-down ratio (BDR) will, of course, be increased so that beads of smaller cross section will result.

With a constant delivery of molten polymeric material to the nozzle, adjustment of the screws 46 as described will cause an increase in the quantity of polymer delivered to the extrusion orifice 31 and thus increase its exit velocity and reduce the web draw-down ratio (WDR). If the rate of quenching is maintained constant, the web in the resulting film will be of increased thickness. Alternatively, quenching of the freshly extruded film may be effected more rapidly so as to maintain the web of constant size.

As described above, reducing the flow of molten polymer to the end block channels will reduce the velocity of the molten polymer issuing therefrom and thereby increase the bead draw-down ratio (BDR). If no change is made in the rate of quenching of the molten polymer as it is extruded or the surface speed of the nip roll assembly, the polymer streams forming the beaded edges of the film will be drawn to a greater degree so as to provide the film beaded edges of smaller cross section.

On the other hand, with this reduced flow of molten polymer through the end block channels, the surface speed of the nip roll assembly may be reduced to thereby reduce both the web and bead draw-down ratios so that both the web and beaded edges of the film will be of increased thickness. If the surface speed of the nip roll assembly is reduced to an extent at which the bead draw-down ratio (BDR) is the same as that which existed under the original operating conditions, it will be apparent that the size of the beaded edges of resulting film will be maintained the same as that formed on the original film while the film web will be of increased thickness.

Aside from the flexibility of the apparatus of the present invention to adapt to different desired operating conditions, it will be apparent that variations in film web thickness and cross section of the film beaded edges can be achieved easily and rapidly without necessitating any change in the extrusion orifice 31 or the end block channels 43.

While preferred embodiments of the invention have been shown and described, it is to be understood that changes and variations may be made without departing from the spirit and scope of the invention as defined in the appended claims.

We claim:

1. Apparatus for shaping a stream of film-forming material into a continuous sheet having enlarged beads along opposite longitudinal edges thereof including a housing, a restricted passage extending longitudinally of said housing and opening along one side thereof, means for supplying a stream of plastic film-forming material into said restricted passage, means carried by said housing defining a substantially uniform extrusion orifice in alignment with said restricted passage for shaping plastic film-forming material into a web, and means disposed outwardly of and separated from the opposite ends of said restricted passage, said last mentioned means being connected with the film-forming material supply means for shaping plastic film-forming material into enlarged beads.

2. Apparatus for shaping a stream of plastic material into a continuous sheet having enlarged beads along opposite longitudinal edges including an elongated housing, a restricted passage extending longitudinally of said housing and opening along one side thereof, means for supplying a stream of plastic material into said restricted passage, blades carried by said housing along said one side thereof defining an extrusion orifice in alignment with said restricted passage for shaping plastic material into a web, plates closing at least a portion of the opposite ends of said extrusion orifice, and means connected with the plastic material supply means and disposed outwardly of said plates for shaping plastic material into enlarged beads.

3. Apparatus as defined in claim 2 further including adjustable means for regulating the flow of plastic material into said bead-shaping means.

4. Apparatus for shaping a stream of plastic material into a continuous sheet having enlarged beads along opposite longitudinal edges including an elongated housing, a restricted passage extending longitudinally of said housing and opening along one side thereof, means for supplying a stream of plastic material into said restricted passage, blades carried by said housing along said one side thereof defining an extrusion orifice in alignment with said restricted passage for shaping plastic material into a web, plates closing at least a portion of the opposite ends of said extrusion orifice, and means connected with the plastic material supply means and disposed outwardly of said plates for shaping plastic material into enlarged beads and directing the same toward the edges of the plastic web as the web and beads leave the apparatus.

5. Apparatus for shaping a stream of plastic material into a continuous sheet having enlarged beads along opposite longitudinal edges thereof including an elongated housing, a chamber formed within said housing, means for supplying a plastic material into said chamber, a restricted passage extending laterally from said chamber and opening along one wall of said housing, blades carried by said housing along said one wall thereof defining an extrusion orifice in alignment with said restricted passage for shaping plastic material into a web, plates disposed over the ends of said housing and closing at least a portion of the ends of the extrusion orifice, end blocks carried by said housing outwardly of said plates, a channel formed in each of said end blocks in longitudinal alignment with the extrusion orifice, an opening in each of said plates connecting said end block channels with opposite ends of said chamber whereby said channels cooperate with said plates for shaping plastic material into enlarged beads.

6. Apparatus as defined in claim 5 further including means for regulating the flow of plastic material into said end block channels.

7. Apparatus for shaping a stream of plastic material into a continuous sheet having enlarged beads along opposite longitudinal edges thereof including an elongated housing, a chamber formed within said housing, means for supplying a plastic material into said chamber, a restricted passage extending laterally from said chamber and opening along one wall of said housing, blades carried by said housing along said one wall thereof defining an extrusion office in alignment with said restricted passage for shaping plastic material into a web, plates disposed over the ends of said housing and closing at least a portion of the ends of the extrusion orifice, end blocks carried by said housing outwardly of said plates, a channel formed in each of said end blocks in longitudinal alignment with the extrusion orifice, an opening in each of said plates connecting said end block channels with opposite ends of said chamber, said channels being inclined toward the extrusion orifice at least along their terminal portions whereby said channels cooperate with said plates for shaping plastic material into enlarged beads and directing the same into engagement with the edges of the shaped web of plastic material.

8. Apparatus as defined in claim 7 wherein the edges of said end blocks adjacent to said plates each include a recess into which open the inclined portions of said end block channels wherein said recesses and adjacent plates together cooperate to shape the plastic material as it is extruded therethrough.

9. Apparatus as defined in claim 7 wherein at least said terminal portions of said channels are inclined att an angle of from 30° to 80° relative to a plane extending perpendicularly to a plane located parallel to said extrusion orifice.

10. Apparatus as defined in claim 7 wherein said plates terminate substantially in the plane of the outer surface of said blades.

11. Apparatus as defined in claim 7 wherein said plates terminate inwardly of the outer surfaces of said blades.

12. A method of making a sheet having enlarged beads along opposite longitudinal edges thereof including the steps of shaping a flowable film-forming material into two independent streams of desired cross section, concomitantly and independently shaping a flowable film-forming material into a web of substantially uniform cross section throughout its width and of less thickness than the shaped streams of film-forming material, engaging the shaped streams of film-forming material with the longitudinal edges of the web, and setting the same in their engaged positions to provide a unitary sheet having beaded longitudinal edges.

13. A method of shaping flowable film-forming material into a unitary beaded edge sheet having a web of substantially uniform thickness throughout its width including the steps of shaping a flowable film-forming material into two independent and laterally spaced streams of desired cross section, concomitantly shaping a flowable film-forming material into a web extending between and spaced from the shaped streams of film-forming material, said web being of substantially uniform cross section throughout its width and of less thickness than the shaped streams of film-forming material, engaging the shaped streams of film-forming materials with the longitudinal edges of the web while the film-forming material of both said shaped streams and web is in a flowable condition, and setting the film-forming material while the shaped streams and web are in engaged relationship to provide a sheet having beaded longitudinal edges.

14. A method of shaping flowable plastic material into a unitary beaded edge sheet having a web of substantially uniform thickness throughout its width including the steps of delivering a mass of flowable plastic material, shaping a portion of the mass of plastic material into a web having a substantially uniform cross section throughout its width, diverting portions of the mass of plastic material and shaping the same into individual streams spaced laterally of and aligned with the longitudinal edges of the web, engaging the shaped streams of plastic material with the longitudinal edges of the web while the plastic material of both the shaped streams and web is in a flowable condition, and setting the plastic material while the plastic shaped streams and web are in engaged relationship to provide a sheet having beaded longitudinal edges.

15. A method of shaping molten plastic material into a unitary beaded edge sheet having a web of substantially uniform cross section throughout its width including the steps of shaping a mass of molten plastic material into two independent and laterally spaced streams of desired cross-section, concomitantly shaping a mass of molten plastic material into a web extending between and spaced from the shaped streams of plastic material, said web being of substantially uniform cross section throughout its width and of less thickness than the shaped streams of plastic material, engaging the shaped streams of plastic material with the longitudinal edges of the web, cooling the engaged shaped streams of plastic material and web to provide a unitary beaded edge sheet, advancing the beaded edge sheet at a rate of speed greater than the speed of the shaped streams and web of plastic material as they move into engagement with each other to thereby effect a longitudinal drawing of the shaped streams of plastic material prior to cooling of the same.

16. A method as defined in claim 15 wherein the shaped streams and web of plastic material are moving at substantially the same speed as they are engaged with each other.

17. A method as defined in claim 15 wherein the shaped streams of plastic material are moving at a speed less than that of said shaped web during engagement therewith.

18. Apparatus as defined in claim 7 wherein at least said terminal portions of said channels are inclined at an angle of from 55° to 65° relative to a plane extending perpendicularly to a plane located parallel to said extrusion orifice.

19. A method as defined in claim 15 wherein the shaped streams and web of plastic material are moving at different speeds as they are engaged with each other.

References Cited in the file of this patent

UNITED STATES PATENTS

| | | |
|---|---|---|
| 2,439,939 | Lesavoy | Apr. 20, 1948 |
| 2,686,931 | Knox | Aug. 24, 1954 |
| 2,754,544 | Bicher | July 17, 1956 |